United States Patent [19]
Belin et al.

[11] Patent Number: 5,799,593
[45] Date of Patent: Sep. 1, 1998

[54] DRAINABLE DISCHARGE PAN FOR IMPACT TYPE PARTICLE SEPARATOR

[75] Inventors: Felix Belin, Brecksville; David J. Walker, Wadsworth, both of Ohio

[73] Assignee: McDermott Technology, Inc., New Orleans, La.

[21] Appl. No.: 664,755

[22] Filed: Jun. 17, 1996

[51] Int. Cl.[6] .......................... F23G 5/00; B01D 45/00
[52] U.S. Cl. .......................... 110/245; 110/216; 55/444
[58] Field of Search ........................... 110/216, 245; 55/429, 432, 444

[56] References Cited

U.S. PATENT DOCUMENTS

| | | | |
|---|---|---|---|
| 4,330,502 | 5/1982 | Engstrom | 110/245 |
| 4,382,415 | 5/1983 | Korenberg | 110/245 |
| 4,891,052 | 1/1990 | Belin et al. | 55/444 |
| 4,951,611 | 8/1990 | Abdulally et al. | 110/216 |
| 4,992,085 | 2/1991 | Belin et al. | 55/444 |
| 5,343,830 | 9/1994 | Alexander et al. | 110/245 |
| 5,378,253 | 1/1995 | Daum et al. | 55/269 |

Primary Examiner—Henry A. Bennett
Assistant Examiner—Gregory A. Wilson
Attorney, Agent, or Firm—Robert J. Edwards; Eric Marich

[57] ABSTRACT

A drainable discharge pan apparatus for an impact type particle separator used on circulating fluidized bed (CFB) boilers employs a plurality of funnel shaped discharge pans located at a lower end of each of the impingement members in the impact type particle separator. The funnel shaped discharge pans prevent accumulation of collected particles thereon, allowing particles collected by the impingement members to fall therethrough, while preventing bypassing of flue gas around lower ends of the impact type particle separator. The outlet ends of the funnel shaped discharge pans provide substantially the same open area for the collected particles to fall therethrough as exists within each associated impingement member.

29 Claims, 7 Drawing Sheets

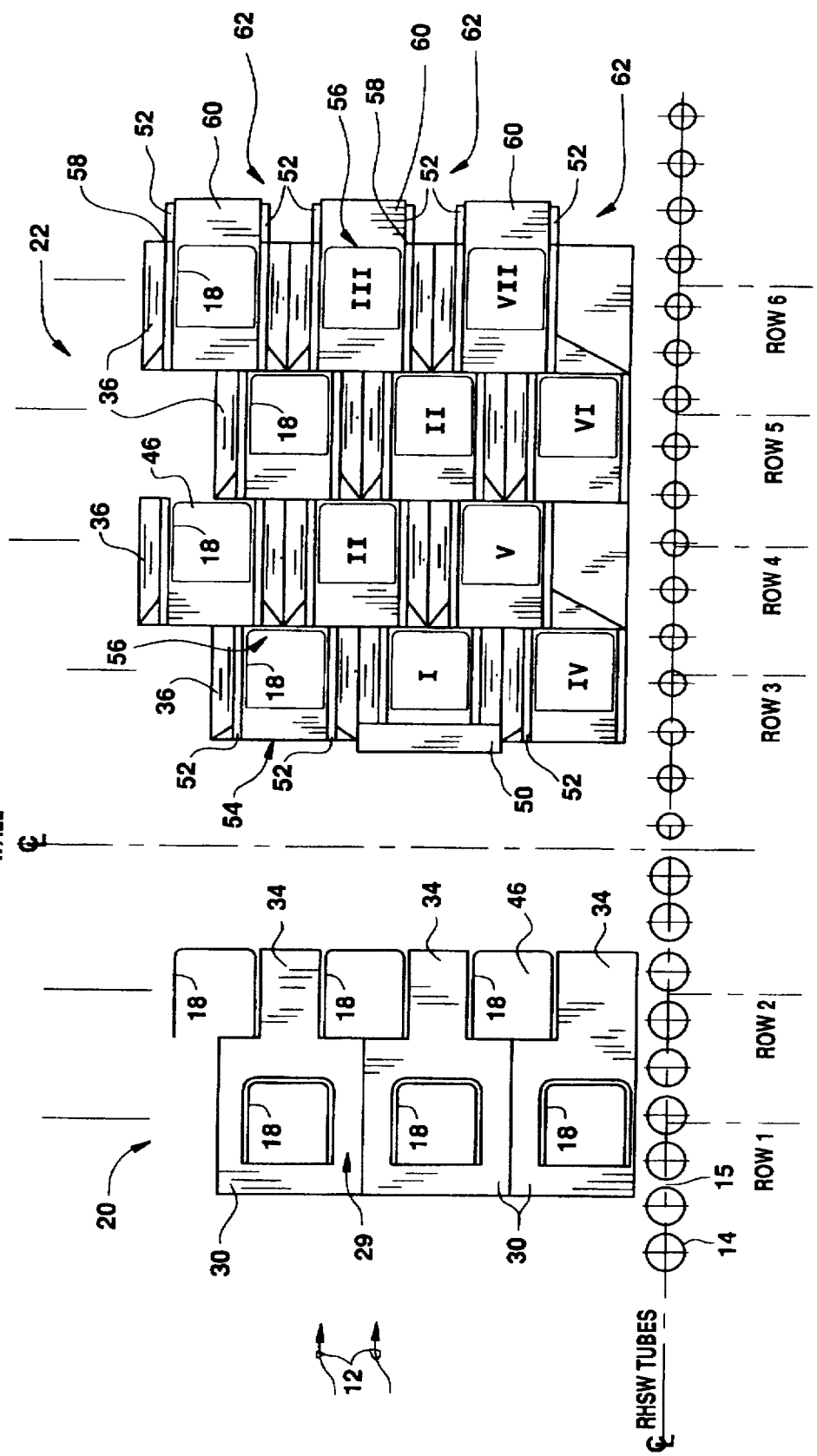

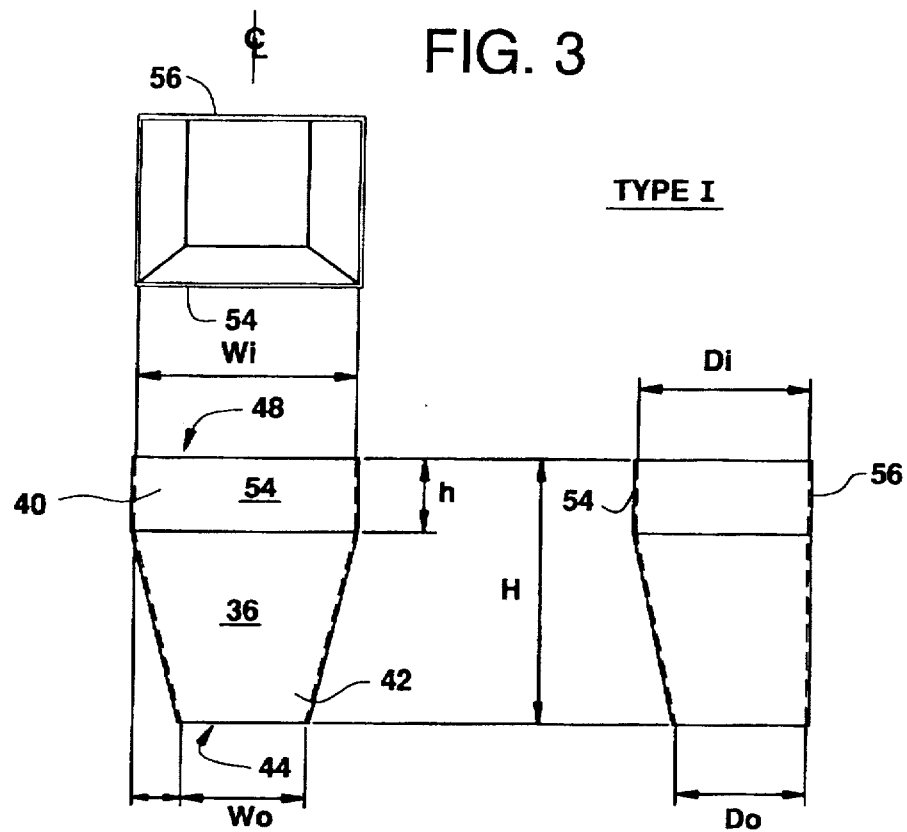
FIG. 3 — TYPE I
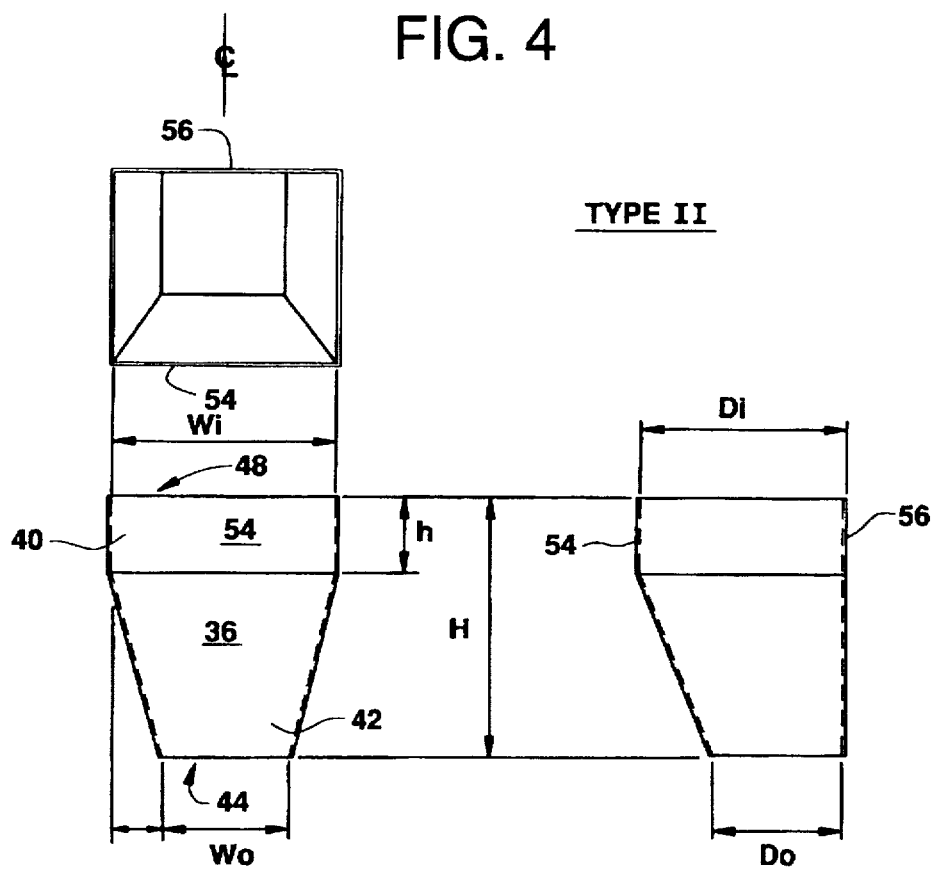
FIG. 4 — TYPE II

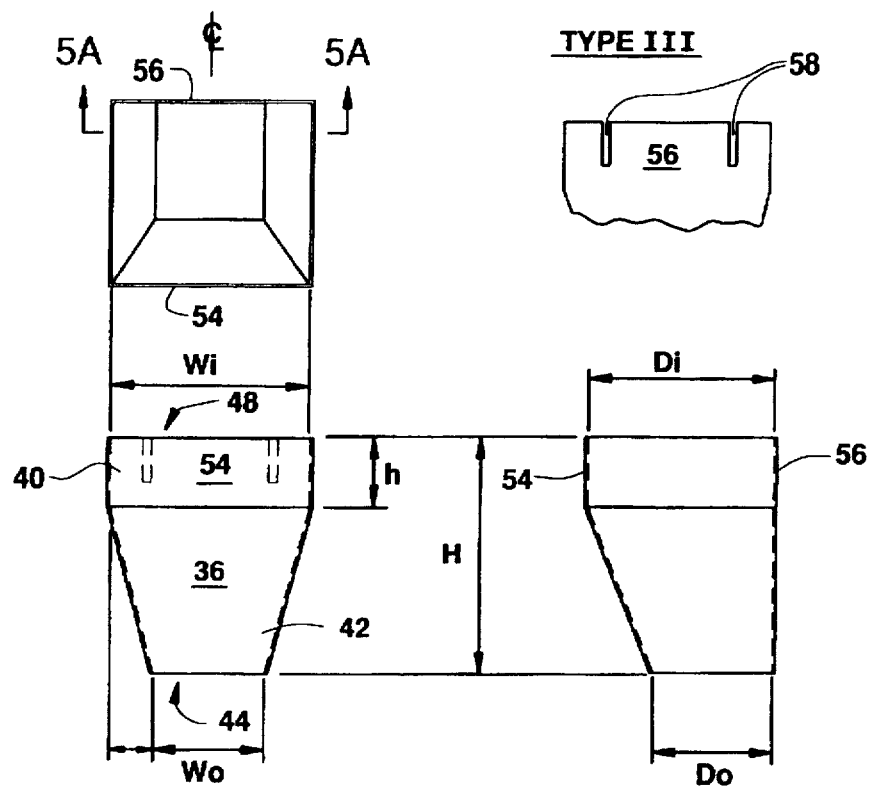
FIG. 5
FIG. 5A
TYPE III
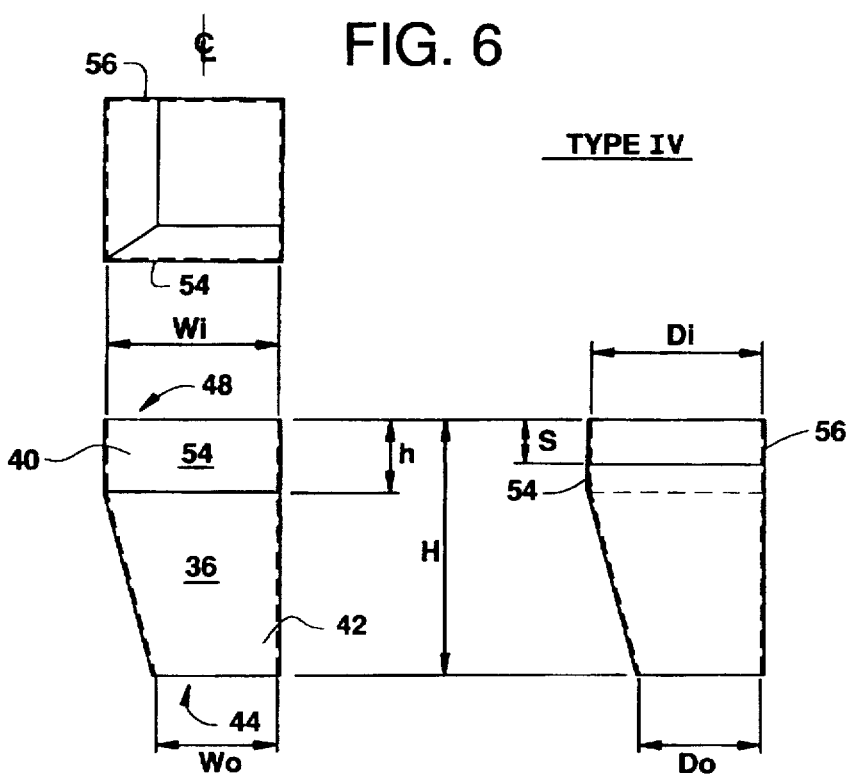
FIG. 6
TYPE IV

TYPE V

TYPE VI

DRAINABLE DISCHARGE PAN FOR IMPACT TYPE PARTICLE SEPARATOR

FIELD AND BACKGROUND OF THE INVENTION

The present invention relates in general to impact type particle separators used in circulating fluidized bed (CFB) boilers, reactors and/or combustors (hereinafter generally referred to as CFB boilers). More particularly, it relates to a drainable discharge pan apparatus for such impact type particle separators which prevents accumulation of collected particles thereon while preventing bypassing of particle-laden flue gas around lower ends of such impact type particle separators.

CFB boiler systems are known and used in the production of steam for industrial process requirements and/or electric power generation. See for example U.S. Pat. No. 5,343,830 to Alexander et al. In CFB reactors, reacting and non-reacting solids are entrained within the reactor enclosure by the upward gas flow which carries solids to the exit at the upper portion of the reactor where the solids are separated by particle separators. The collected solids are returned to the bottom of the reactor.

One CFB boiler arrangement uses a plurality of impact type particle separators (or concave impingement members or U-beams) at the furnace exit to separate particles from the flue gas. U.S. Pat. Nos. 4,992,085 and 4,891,052 to Belin et al. disclose such impact type particle separators. While these separators can have a variety of configurations, they are commonly referred to as "U-beams" because they most often have a U-shaped configuration in cross-section. When applied to a CFB boiler, a plurality of such impact type particle separators are supported within the furnace enclosure and extend vertically in at least two rows across the furnace exit opening, with collected particles falling unobstructed and unchannelled underneath the collecting members along the rear enclosure wall. Two rows of such impact type particle separators are commonly used in the furnace, typically in combination with two to four further rows of downstream, external (with respect to the furnace enclosure) impact type particle separators. The downstream separators also collect solids from the flue gas and return them to the furnace, either via a hopper and an L-valve, or directly and internally via a cavity as disclosed in U.S. Pat. No. 5,343, 830 to Alexander et al. The downstream, external, impact type particle separators are needed since the efficiency of the upstream internal impact type particle separators, is not sufficient to prevent excessive solids carryover to the downstream convection gas pass which may cause erosion of the convection surfaces and an increase of the required capacity of the secondary particle collection/recycle equipment.

Because such external impact type particle separators have an inherent flow resistance, care must be taken to prevent the flue gas from bypassing all or portions of the separators such as by flowing underneath them through the hopper or cavity. If such gas bypassing were permitted, some of the particles in this hopper would "spill over" or become re-entrained in the flue gas. To prevent this, one approach placed a large plate over the hopper. The plate had a plurality of openings through which the lower ends of the U-beams extended. Later, another approach employed a bottom plate or flat discharge pan installed across the lower ends of each of the U-beam elements. These pans, like the large plate, also separated the main flue gas passage from the hopper or cavity and prevented the flue gas from flowing across the top of the collected particles. The flat discharge pan has also been utilized to provide alignment of the lower end of each U-beam with respect to adjacent U-beams.

The known flat discharge pans comprises a horizontal flat plate and vertical flanges on four sides extending downwards therefrom which form the sides of each discharge pan. There is an opening in each of the horizontal flat plates through which its associated U-beam channel extends. The collected solids falling inside the U-beam channel pass through the opening in the horizontal flat plate.

The openings in the flat discharge pans were restricted in size to correspond to the enclosed area of the vertically suspended elements of the impact type particle separators or U-beams. With a large number of elements, gas bypassing underneath the separators cannot be fully prevented, but it is reduced to an acceptable level.

In another attempt to minimize gas bypassing, one field-installed modification located a box or cone with a smaller opening around and underneath each opening in the flat discharge pans for solids discharge into the hopper. Although this initially appeared to be a satisfactory solution, after some period of operation these boxes or cones were found to be plugged as a result of the sintering of the collected particles.

The constituents of some fuels or bed media create a tendency for the circulating solids in the CFB boiler to stick together or agglomerate, and the collected solids can build in depth on the horizontal portion of the known U-beam flat discharge pans. This tendency for solids to agglomerate is aggravated by solids lying stagnant in the high temperature flue gas stream. If allowed to continue, this accumulation of solids can increase weight on the U-beams, restrict gas flowing through the lower portion of the U-beam collectors above the respective flat discharge pans, and in extreme cases may partially restrict discharge of particles from individual U-beams. Restriction or disturbance of gas flow through the lower portion of the U-beams just above the flat discharge pans, as well as partial restriction of the discharge from individual U-beam channels, may cause reduction of collection efficiency.

SUMMARY OF THE INVENTION

A primary purpose of the present invention is to provide a drainable discharge pan apparatus which prevents accumulation of solids on the discharge pans, without increasing the open area between a zone above the elevation of the discharge pans (i.e., in the flue gas flow) and a zone beneath the discharge pans. By preventing accumulation of solids, conditions for agglomeration of stagnant solids at the lower portion of the impingement members is avoided. Loading on the impingement member is not increased, flue gas flow in the collection portion of the impingement member is not restricted, and restriction of the discharge end of individual impingement member channels is prevented.

Accordingly, one aspect of the present invention is drawn to an apparatus for an impact type particle separator used to collect particles from particle-laden flue gas in a CFB boiler which provides for drainage of particles from spaces in between adjacent impingement members as well as from inside of the impingement member and which minimizes gas bypassing around a lower end of the particleseparator. A funnel shaped discharge pan having an inlet portion for receiving the lower end of an impingement member and an outlet portion for discharging particles therefrom is provided on the impingement member. The outlet portion has an outlet flow area approximately equal to an open flow area defined within sides of the impingement member, while the

3 inlet portion has an inlet flow area greater than the outlet flow area of the outlet portion, and securing means are provided for securing the discharge pan to the lower end of the impingement member.

The funnel shaped configuration essentially eliminates horizontal surfaces at the discharge pans. The area of the discharge opening in the bottom outlet portion of each funnel shaped discharge pan is approximately equal to the open flow area inside each impingement member, and is no larger than the openings in the horizontal flat discharge pans described earlier. Any flow of gases below the discharge end of funnel-shaped discharge pans, which potentially could re-entrain a portion of the collected solids, is restricted at least to the degree provided by the known horizontal flat discharge pans. By locating the back of each impingement member adjacent to the rear of each funnel shaped discharge pan, cross flow of gases below each impingement member and across the downward falling solids collected by each impingement member (which could cause re-entrainment of solids in the flue gas flow) is prevented.

The various features of novelty which characterize the invention are pointed out with particularity in the claims annexed to and forming a part of this disclosure. For better understanding of the invention, its operating advantages and the specific benefits attained by its uses, reference is made to the accompanying drawings and descriptive matter in which preferred embodiments of the invention are illustrated.

BRIEF DESCRIPTION OF THE DRAWINGS

FIG. 2 is a partial sectional plan view of FIG. 1 taken in the direction of arrows 2—2;

FIGS. 3–9 are views illustrating various configurations of the funnel shaped discharge pans of the present invention.

DESCRIPTION OF THE PREFERRED EMBODIMENTS

As used herein, the term CFB boiler will be used to refer to CFB reactors or combustors wherein a combustion process takes place. While the present invention is directed particularly to boilers or steam generators which employ CFB combustors as the means by which the heat is produced, it is understood that the present invention can readily be employed in a different kind of CFB reactor. For example, the invention could be applied in a reactor that is employed for chemical reactions other than a combustion process, or where a gas/solids mixture from a combustion process occurring elsewhere Is provided to the reactor for further processing, or where the reactor merely provides an enclosure wherein particles or solids are entrained in a gas that is not necessarily a byproduct of a combustion process. Similarly, the term U-beam will be used to refer to impact type particle separators of the type disclosed in U.S. Pat. Nos. 4,891,052; 4,992,085; and 5,343,830. The term U-beam is used in the following discussion for the sake of convenience, and is meant to refer broadly to any type of concave impingement members or impact type particle separators used to collect and remove particles from a particle laden flue gas. Particularly, the impact type particle

4 separators are non-planar; they may be U-shaped, E-shaped, W-shaped, or any other shape as long as they have a concave or cupped surface which is presented to the oncoming flow of flue gas and entrained particles which will enable the members to collect and remove particles from the flue gas.

Figure 1:
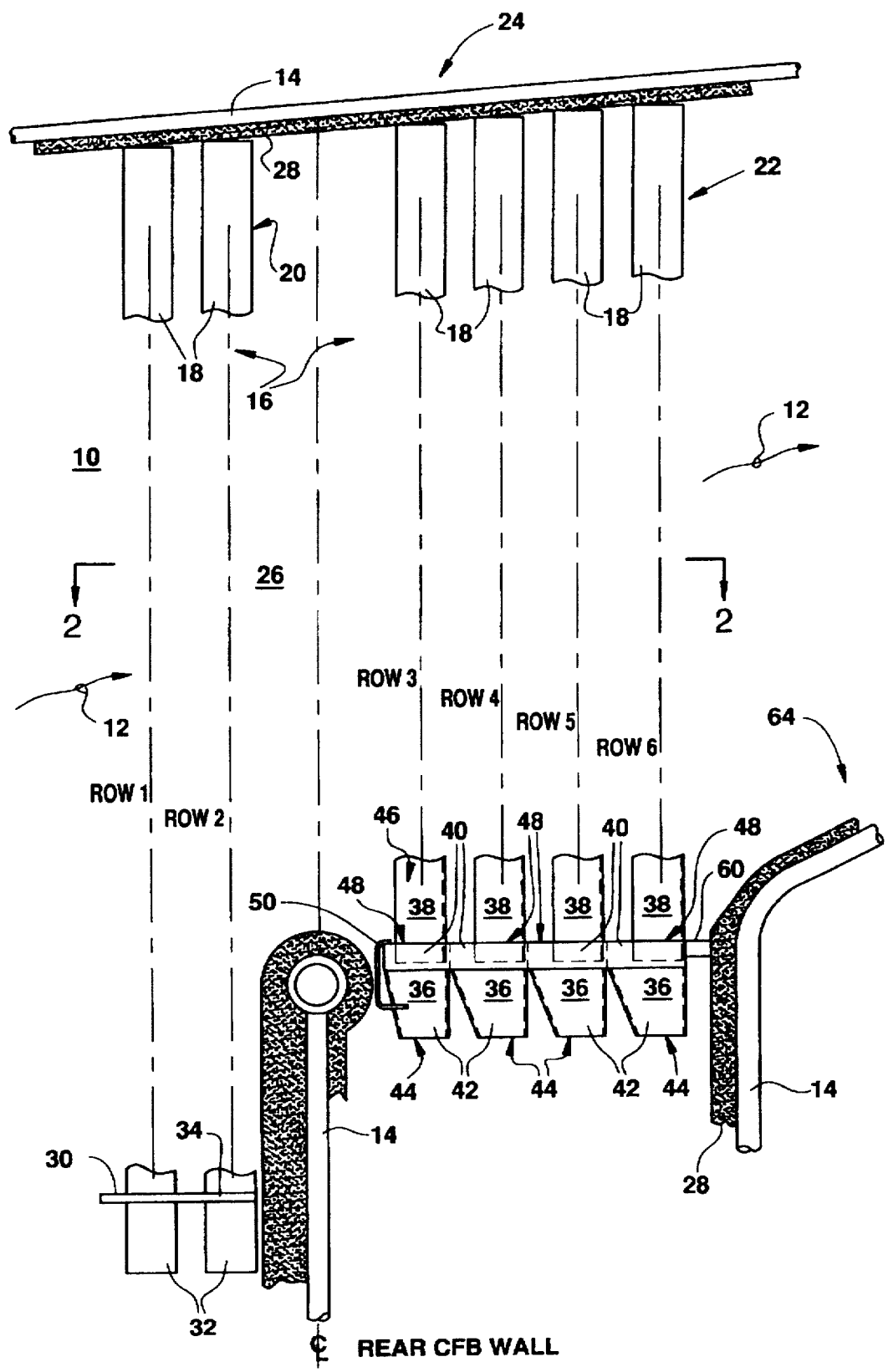
FIG. 1 is a sectional side view of an upper portion of a CFB boiler showing a primary impact type particle separator having both in-furnace U-beams and external U-beams.
Figure 7:
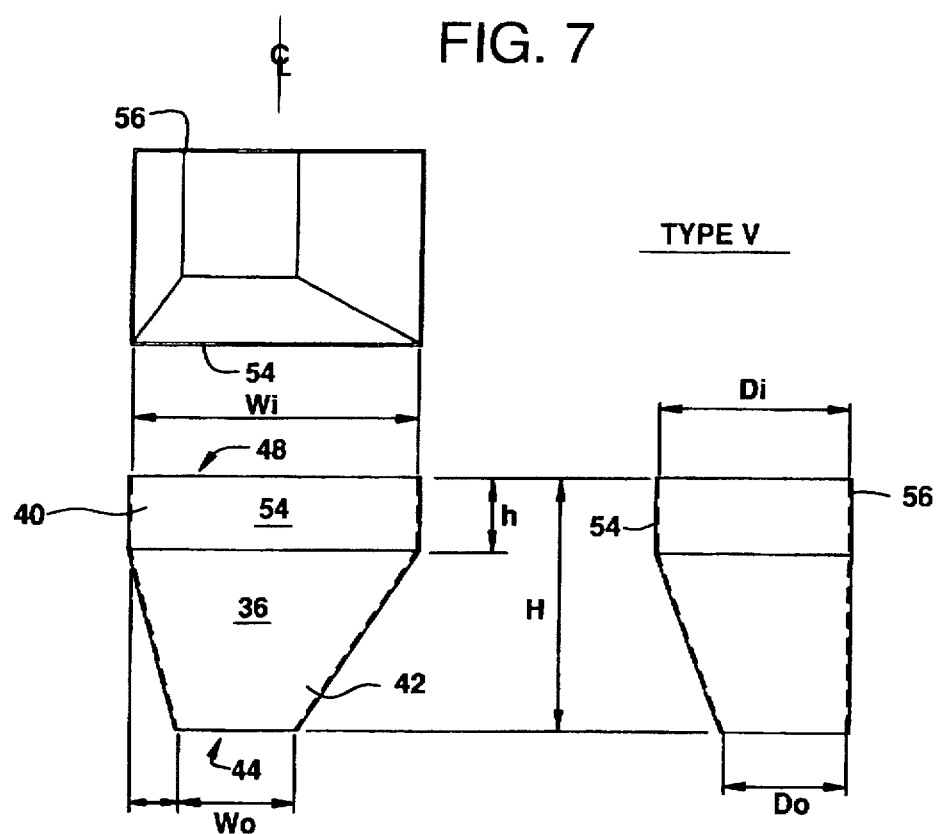

Referring to the drawings generally, wherein like numerals designate the same or functionally similar elements throughout the several drawings, and to FIG. 1 in particular, there is shown an upper portion 10 of a CFB boiler to which the subject matter of the present invention is applied. The CFB boiler furnace or reactor contains the combustion process and the flue gas/solids mixture 12 produced thereby within fluid cooled enclosure walls 14. The enclosure walls are typically tubes separated from one another by a steel membrane 15 (not shown in FIG. 1; see FIG. 2) to achieve a gas-tight enclosure. The flue gas/solids mixture 12 flows upwardly through the reactor enclosure of the CFB boiler to the upper portion 10 thereof transferring a portion of the heat contained therein to the fluid cooled enclosure walls 14. A primary, impact type particle separator 16 is located in the upper portion 10 of the CFB boiler and is used to collect particles from the flue gas/solids mixture 12 and return them to the lower portion (not shown) of the CFB furnace. In the preferred embodiment shown, the primary, impact type particle separator 16 comprises 4–8 rows of concave or cupped impingement members 18, which as described earlier will be generally referred to as U-beams 18. The U-beams 18 are generally arranged in two groups--an upstream group 20 having 2 or more rows and generally referred to as the in-furnace U-beams 20, and a downstream group 22 having 2–6 rows. U-beams 18 are supported from roof 24 of the CFB boiler, are typically made of stainless steel to withstand the high temperature erosive environment within a CFB boiler, but other materials suitable for such environments can be used, and the U-beams 18 are generally designed according to the teachings of U.S. Pat. No. 4,992, 085, the specification of which is hereby incorporated by reference.

The U-beams 18 in both the upstream group 20 and the downstream group 22 are positioned in the upper portion 10 of the CFB boiler across the height and width of an exit area 26 from the CFB boiler furnace. Since the particles within the flue gas/solids mixture 12 are erosive in nature, a layer of refractory 28 is generally applied to the surfaces of the fluid cooled tubes 14 to protect them. As shown in FIG. 2, each U-beam in a given row is separated from an adjacent U-beam by a gap 29. Subsequent downstream rows of U-beams 18 are staggered with respect to preceding rows so that the U-beams 18 of a downstream row are generally in alignment with the gaps 29 of a preceding row. The elaborate arrangement of U-beams provides a tortuous path for the flue gas/solids mixture 12 causing particles to impact the individual U-beams 18 and free fall by gravity and return to a lower portion (not shown) of the CFB boiler reactor enclosure.

Figure 10:
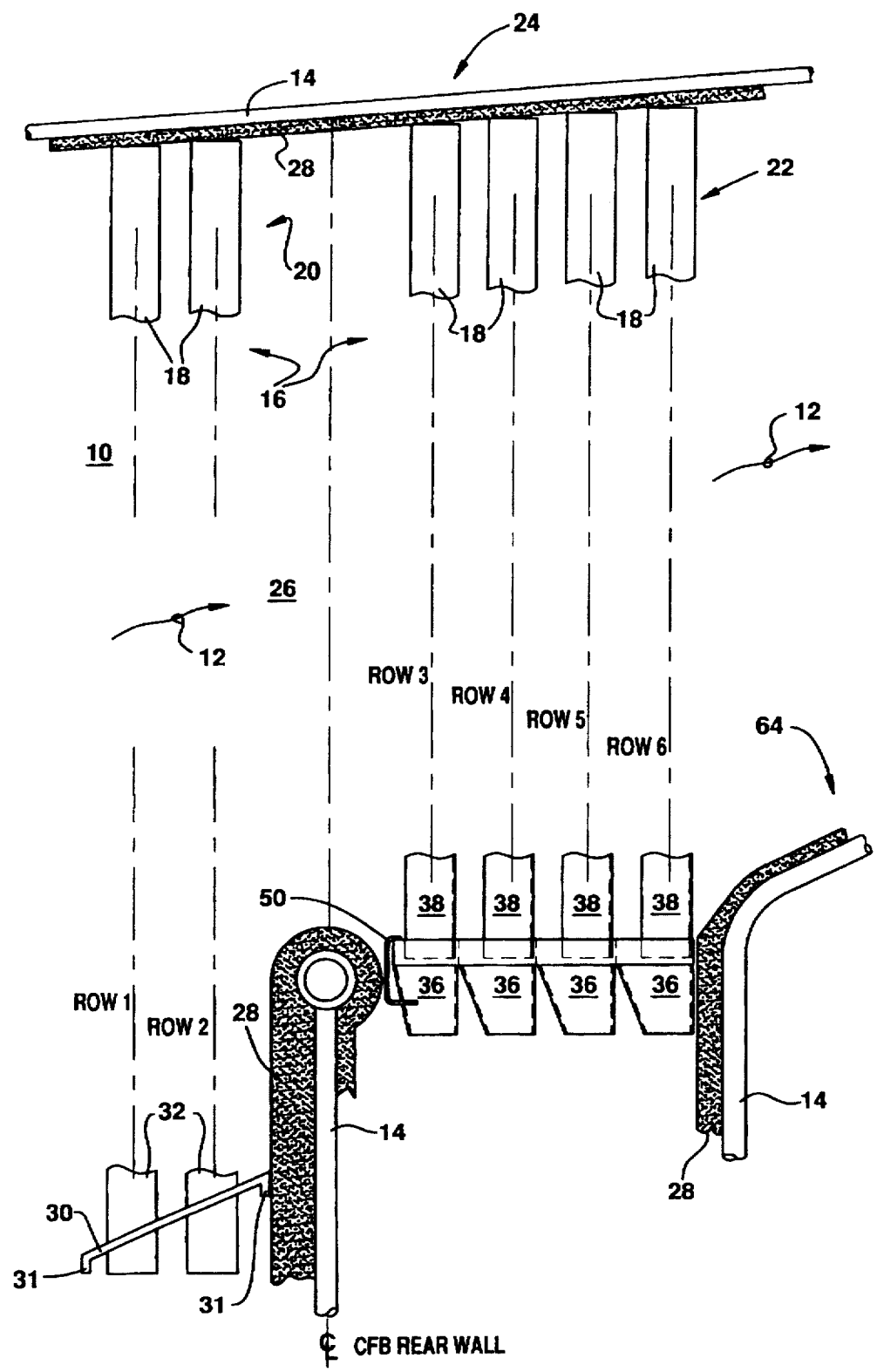
FIG. 10 is a sectional side view similar to FIG. 1, showing another embodiment of the present invention.

To assist in keeping the in-furnace group 20 of U-beams 18 in alignment, an arrangement of flat plates 30 are provided at a lower end 32 thereof. The flat plates 30 encircle the individual U-beam elements 18 in the first row and abut each other to maintain the first row of in-furnace U-beams 18 in alignment. The plates 30 have a rearwardly extending portion 34 which extends in between the adjacent U-beams 18 in the second row. These extending portions 34 abut the sides of the U-beams 18 in the second row and likewise maintain their alignment. Alternatively, individual plates or pans on each of the U-beams 18 in a given row could also be used to maintain alignment. In either case, since the extending portions 34 of plates 30 abut the refractory 28 on the tubes 14 forming the rear CFB wall, they also provide a baffle effect to prevent flue gas/solids 12 from bypassing upwardly along the lower ends of the in-furnace U-beams 20 and thus enhance collection efficiency. Plates 30 can be substantially horizontal as shown in FIG. 1, or inclined as shown in FIG. 10 infra to prevent solids accumulation thereon.

In accordance with a preferred aspect of the present invention, the downstream group 22 of U-beams 18 are each provided with a stainless steel, funnel shaped discharge pan 36 at lower ends 38 thereof. Each funnel shaped discharge pan 36 has an inlet portion 40 for receiving the lower end of its associated U-beam separator element 18, and an outlet portion 42 for discharging particles therefrom. Outlet portion 42 has an outlet flow area 44 approximately equal to open flow area 46 defined within sides of the individual U-beam separator elements 18. The inlet portion 40 has an inlet flow area 48 greater than the outlet flow area 44 which gives each funnel shaped discharge pan element 36 its funnel shape. A baffle plate 50 will typically be provided on each of the funnel shaped discharge elements 36 on the first row of the downstream group 22 of U-beams (row 3 in the Figs.) to prevent gas bypassing around lower ends of the funnel shaped discharge pans 36.

Referring now to FIG. 2, there is shown a partial sectional plan view of FIG. 1 which illustrates the staggered arrangement of U-beam elements 18 arranged in the upstream and downstream groups of separators 20, 22, respectively. For clarity purposes, only one of the baffles 50 is illustrated, attached to one of the funnel shaped discharge pans 36 in the first row of the downstream group 22 of U-beams 18. To secure the funnel shaped discharge pans 36 to the lower end 38 of each of the individual U-beams 18, a pair of flat, rectangular stainless steel plates 52 extend within the inlet portion 40 of the funnel shaped discharge pans 36. In most cases, plates 52 are welded at their ends to a front 54 and a rear 56 of the inlet portion 40 of each funnel shaped discharge pan 36. They are also welded at their sides to the lower ends 38 of each of the U-beams 18. Additionally, the U-beams 18 fit flush up against the rear 56 of the inlet portion 40 and are also welded at their lower ends 38 to the rear 56 of the inlet portion 40 of each funnel shaped discharge pan 36. This type of construction will be seen in rows 3, 4, and 5 of the downstream group 22, consisting of four (4) rows of U-beams.

In some cases, particularly shown as the funnel shaped discharge pans of row 6 in the downstream group 22, the securing means still comprise the pair of plates 52 extending within the inlet portion of the funnel shaped discharge pan, but they also extend through slots 58 emplaced in the rear 56 of the inlet portion 40. In this case, each plate 52 is welded at one end to the front 54 of the inlet portion 40, while the opposite end of each plate 52 extends through the slots 58 and terminates outside of the rear 56 of the inlet portion 40 so that it is capable of supporting a horizontal plate 60 at the rear 56 of the funnel shaped discharge pan 36. Gaps 62 existing in between the U-beam elements provide a passageway for particles which may slide down along an inclined portion 64 of the CFB boiler enclosure, downstream of the U-beams. Alternatively, as shown in Fig. 10 infra the plates 60 at the rear 56 of the discharge pans 36 on the last row of the U-beams 18 can be eliminated, and the refractory 28 extending from inclined portion 64 is thus located just adjacent to the last row of discharge pans 36.

It will be seen that the various arrangement and spacing requirements of the individual U-beams 18 and their associated funnel shaped discharge pans 36 dictates that various configurations of the funnel shaped discharge pans 36 will be necessary. The particular shape of each funnel shaped discharge pan depends upon the location of the U-beam with which it is associated; i.e., whether the U-beam is adjacent to a side wall of the CFB boiler, and/or is a leading, intermediate or last row U-beam. In the preferred embodiment, seven different shapes of funnel shaped discharge pans 26 are employed. These are generally designated by Roman Numerals as Types I through VII in FIG. 2, and are more particularly shown and described in FIGS. 3–9. FIGS. 5 and 9 also identify the particular locations of the aforementioned slots 58 which are provided in the rear 56 of funnel shaped discharge pans 36 used in the rearmost (sixth) row of U-beams 18. Again, even if horizontal plates 60 are employed, a weld would be provided connecting the lower end 38 of each U-beam 18 to the rear 56 of the inlet portions 40 of each funnel shaped discharge pan 36.

Figure 8:
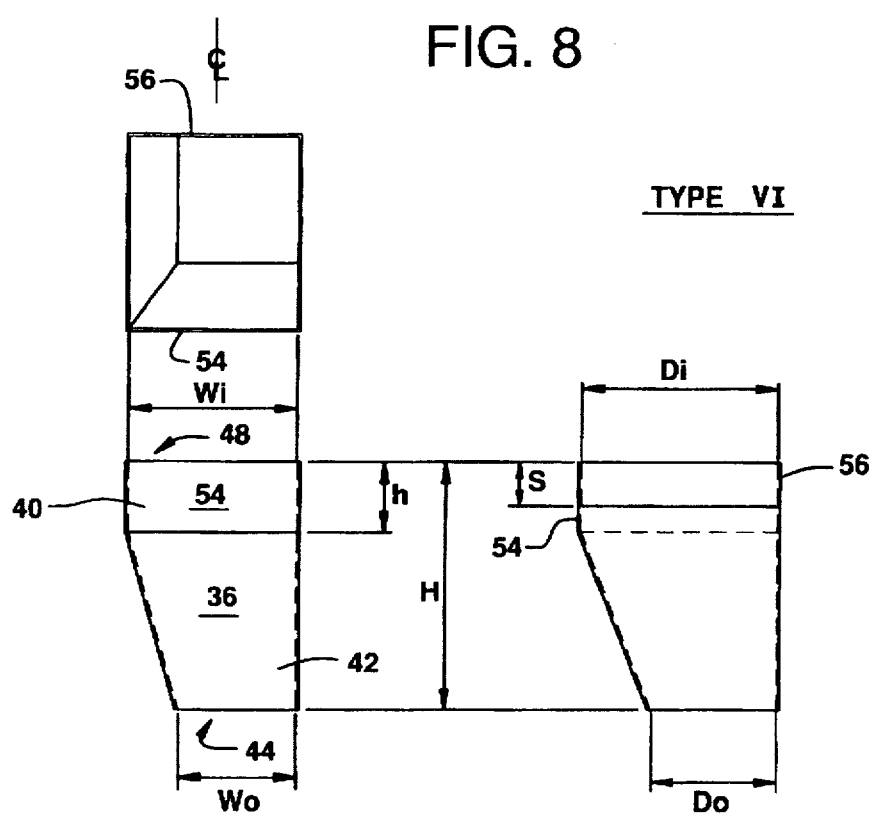
Figure 9:
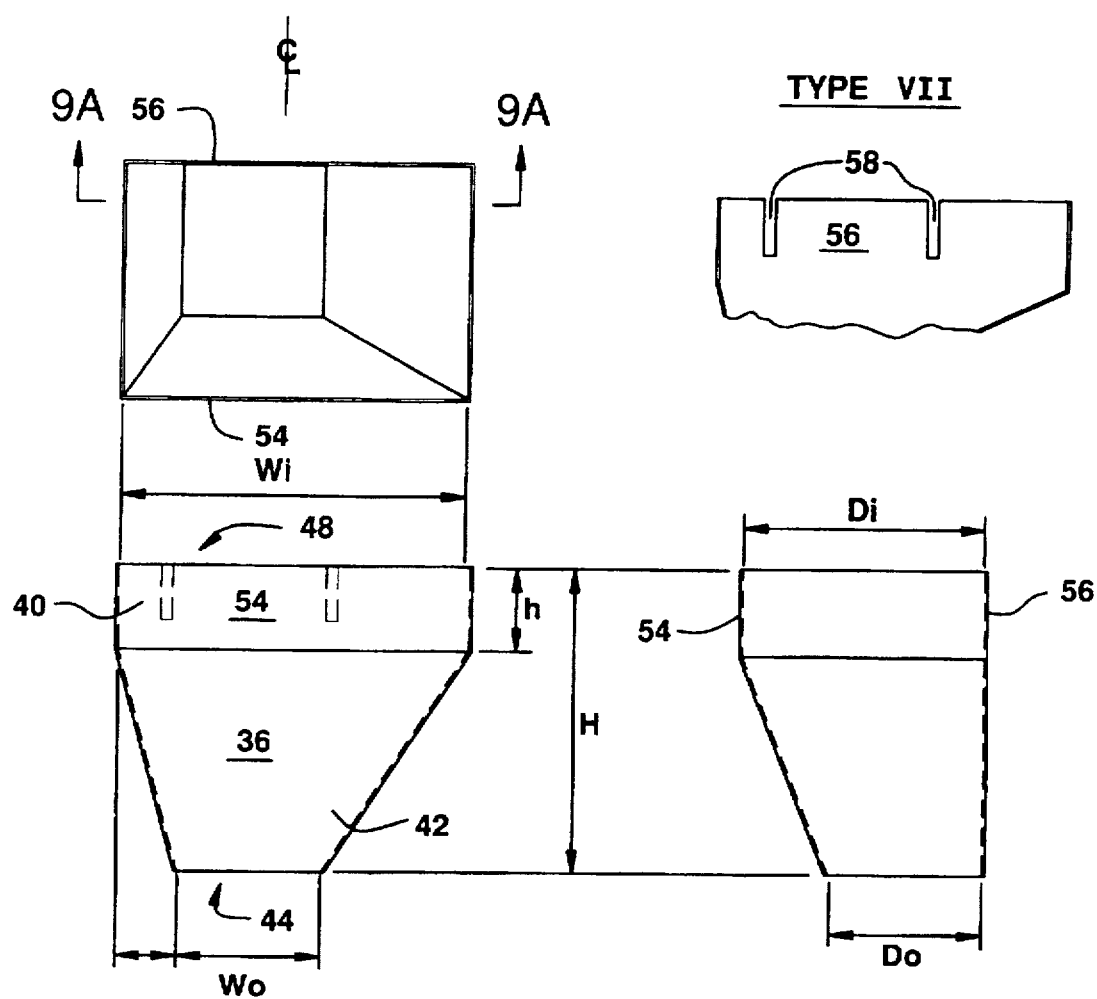
Figure 9A:
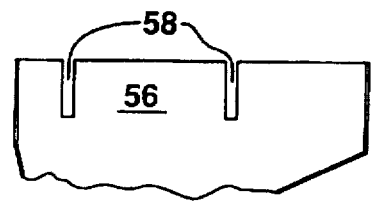

Each of FIGS. 3–9 depict, respectively, the type I through VII funnel shaped discharge pans 36. Each of FIGS. 3–9 contains front, plan, and right-hand side views of the pan 36. Each pan 36 has a height H, a width W, and a depth D (in the direction of flue gas/solids flow 12). The "i" subscript on the width W and depth D denote "inlet"; the "o" subscript represents "outlet". Each pan 36 has an inlet portion 40 having four plate sides and a height h, and a funnel shaped outlet portion 42, also having four plate sides and generally an inverted frustopyramid shape. The width $W_i$ of each pan 36 is selected so that each pan 36 extends from an adjacent pan 36 at the mid-point of a gap 29 between adjacent U-beams 18 and/or extends towards an adjacent wall. $W_i$ thus varies depending upon where the pan 36 will be located. Similarly, the depth $D_i$ of each pan 36 is selected so that each pan 36 extends between the rear of individual successive rows of U-beams 18. In some cases, such as with the leading row 3 of the downstream group 22 of U-beams, the front 54 is located based upon its proximity to the centerline of the rear CFB boiler wall as shown in FIG. 1. In other cases, such as with the last row 6 of the downstream group 22 of U-beams, the pans 36 are provided with the aforementioned horizontal plates 60 as shown in FIG. 1, or the plates 60 can be omitted in which case the pans 36 extend to a point adjacent the refractory 28 at the beginning of the inclined portion 64, as shown in FIG. 10, infra. Thus the pans 36 may be symmetrical when viewed from the front, as in types I–III, or asymmetrical when viewed from the front as shown in types IV–VII when the pans 36 are applied adjacent to a wall. In some cases, such as in types IV and VI, a portion of the right-hand side of the upper portion 40 of pan 36 may be cut away to provide for locating the right support plate 52. As shown in FIGS. 6 and 8, this cut-out portion would have a height denoted by "S". In preferred embodiments of the invention, the area inside the U-beams 18 is approximately 6¼ in. wide by approximately 6¾ in. deep giving an open free flowing area within the U-beams of approximately 42 in.$^2$. The height H of the discharge pans 36 used with such U-beams 18 is approximately 14 in., the height h of the inlet portion being approximately 4 in. For this preferred size of U-beam, the outlet flow area is approximately 42 in.$^2$, with the exception of the discharge pans 36 of types IV and VI which have an outlet flow area of approximately 44 in.$^2$, and in any event no smaller than the open area contained within the sides of the U-beams 18. Similarly, for this preferred size of U-beam, the inlet flow area 48 varies from a low of approximately 79 in.$^2$ for type IV pans, to approximately 159 in.$^2$ for type V and VII pans. However, as discussed below, the present invention can also be employed with other sizes of U-beams 18.

Another important parameter that should be observed is the true "valley angle" at the corners of the sloped sides of the frustopyramid portion of the discharge pans 36. The valley angle is the true angle of inclination of the line of intersection of any two adjacent sloped sides of the discharge pans 36 and a horizontal plane. A valley angle of 90 degrees would mean that the intersecting sides of the discharge pans 36 are vertical. If only one side intersecting at a corner was inclined, and the other was vertical, the valley angle would be equal to the angle of inclination of the other, inclined, side. If both sides meeting at a corner are inclined, the valley angle is somewhat less than the smaller angle of inclination of either intersecting side. To ensure that collected solids slide down through the discharge pans 36, the valley angle at the corners formed by the sloped sides of the discharge pans 36 is not less than approximately 50 degrees, and preferably not less than approximately 60 degrees. This will help to proportionately size the discharge pans 36 for a given U-beam 18.

These two parameters for the design of the discharge pans 36, namely: (1) that the outlet area 44 is not smaller than the open area contained within the sides of the U-beams 18, and (2) that the valley angle is preferably not less than approximately 60 degrees, can be used to accommodate any size of U-beams 18. U-beams 18 can thus be wider and/or deeper than the preferred size of approximately 6¼ in. wide and approximately 6¾ in. deep; the pans 36 would still extend between adjacent U-beams 18 as desired, and the heights h and H would vary proportionally as necessary to accommodate a given size of U-beam 18. If desired, different sizes of U-beams 18 (and pans 36) could be employed at various locations in the same separator 16 to take care of special design situations.

Finally, FIG. 10 shows a sectional side view similar to that of FIG. 1, showing: (1) that the sloped flat plates 30 used on the in-furnace group 20 of U-beams 18 discussed earlier; and (2) the elimination of the horizontal plates 60 at the rear 56 of the last row of U-beams 18, also discussed earlier. If desired, the in-furnace group 20 of U-beams could be provided with sloped flat plates 30 (as shown in FIG. 10) and they could also be provided with flanges 31 as shown which also abut the refractory 28 on the CFB rear wall tubes to further limit gas bypassing around the lower ends of these in-furnace group 20 of U-beams 18.

It will thus be seen that the present invention provides several advantages over the prior constructions. Since substantially all of the horizontal surfaces usually present in the vicinity of the lower ends 38 of each of the U-beams 18 are eliminated, there only being line edges of each of the plate members forming the sides of the funnel shaped discharge pans 36, accumulation of solids which could occur due to agglomeration is essentially prevented. Preventing such solids from accumulating thus reduces loading on the U-beams 18, and permits a more economical construction. Similarly, the prevention of solids from accumulating in turn prevents restriction or disturbance of flue gas/solids flow 12 through the U-beams 18 and therefore maintains collection efficiency at peak design conditions. Since solids no longer can accumulate on any flat surfaces near the lower ends 38 of the U-beams 18, restrictions of solids falling through the individual U-beams at the discharge lower ends thereof is also eliminated, again favorably maintaining collection efficiency.

As indicated earlier, while the impingement members 18 of the impact type particle separator 16 are preferably of a channel-shaped configuration (i.e., a U-beam), other cross-sectional configurations that serve to collect and remove particles from the flue gas 12 as described above, or their equivalents, could be employed.

While specific embodiments of the invention have been shown and described in detail to illustrate the application of the principles of the invention, it will be understood that changes may be made to the invention or it may be embodied otherwise without departing from such principles. By way of example and not limitation, the funnel shaped discharge pans of the present invention may be applied to new construction involving CFB boilers, or to the replacement, repair or modification of existing CFB boilers. This is true whether or not such CFB boilers employ the known L-valve type of construction, or to the type of construction disclosed in U.S. Pat. No. 5,343,830. Thus the embodiment of FIGS. 1 or 10 could be considered or used in new or retrofit construction, depending upon the particular installation. The sizes of the U-beams 18 and of their associated discharge pans 36 would be designed as set forth above. In some embodiments of the invention, certain features of the invention may be sometimes be used to advantage without a corresponding use of other features. Accordingly, all such changes and embodiments properly fall within the scope of the following claims.

We claim:

1. An apparatus for an impact type particle separator used to collect particles from particle-laden flue gas in a circulating fluidized bed (CFB) boiler which provides for drainage of particles from spaces in between adjacent impingement members of the particle separator as well as from inside of the impingement member and which minimizes gas bypassing around a lower end of the particle separator, comprising:

a funnel shaped discharge pan which essentially eliminates horizontal surfaces at the discharge pan, having an inlet portion for receiving the lower end of an impingement member and an outlet portion for discharging particles therefrom, the outlet portion having an outlet flow area approximately equal to an open flow area defined within sides of the impingement member, the inlet portion having an inlet flow area greater than the outlet flow area of the outlet portion; and securing means for securing the discharge pan to the lower end of the impingement member.

2. The apparatus according to claim 1, wherein the securing means comprises a pair of plates extending within the inlet portion of the discharge pan, welded at their ends to a front and a rear plate of the inlet portion and at their sides to the lower end of the impingement member, and a weld connecting the lower end of the impingement member to the rear plate of the inlet portion of the discharge pan.

3. The apparatus according to claim 1, wherein the securing means comprises a pair of plates extending within the inlet portion of the discharge pan and through slots in a rear plate of the inlet portion, each plate welded at one end to a front plate of the inlet portion, an opposite end of each plate terminating outside of the rear plate of the inlet portion of the discharge pan and supporting a horizontal plate at the rear of the discharge pan, and a weld connecting the lower end of the impingement member to the rear plate of the inlet portion of the discharge pan.

4. The apparatus according to claim 1, wherein the impingement member of the impact type particle separator is U-shaped, E-shaped, W-shaped or of some similar concave or cupped configuration.

5. The apparatus according to claim 1, wherein the funnel shaped discharge pan has a front and is symmetrical about a vertical centerline when viewed from the front.

6. The apparatus according to claim 1, wherein the funnel shaped discharge pan has a front and is asymmetrical about a vertical centerline when viewed from the front.

7. The apparatus according to claim 1, wherein the impingement member is a U-beam and the open flow area defined within sides of the impingement member is approximately 42 in.$^2$, the outlet flow area of the outlet portion of the discharge pan is approximately 42 in.$^2$ to approximately 44 in.$^2$, and the inlet flow area of the inlet portion of the discharge pan is approximately 79 in.$^2$ to approximately 159 in.$^2$.

8. The apparatus according to claim 1, wherein the funnel shaped discharge pan has a height H of approximately 14 in. and the inlet portion has a height h of approximately 4 in.

9. The apparatus according to claim 1, wherein the funnel shaped discharge pan has a valley angle not less than approximately 50 degrees.

10. The apparatus according to claim 9, wherein the valley angle is approximately 60 degrees.

11. In a circulating fluidized bed (CFB) boiler having an impact type primary particle separator used to collect particles from particle-laden flue gas in the CFB boiler, the primary particle separator having a plurality of impingement members for collecting and removing particles from the flue gas, an apparatus which provides for drainage of particles from spaces in between adjacent impingement members as well as from inside of the impingement members and which minimizes gas bypassing around a lower end of the particle separator, comprising:

for each impingement member, a funnel shaped discharge pan which essentially eliminates horizontal surfaces at the discharge pan, having an inlet portion for receiving the lower end of its associated impingement member and an outlet portion for discharging particles therefrom, the outlet portion having an outlet flow area approximately equal to an open flow area defined within sides of its associated impingement member, the inlet portion having an inlet flow area greater than the outlet flow area of the outlet portion; and securing means for securing each discharge pan to the lower end of its associated impingement member.

12. The apparatus according to claim 11, wherein the securing means comprises a pair of plates extending within the inlet portion of each discharge pan, welded at their ends to a front and a rear of the inlet portion and at their sides to the lower end of its associated impingement member, and a weld connecting the lower end of each impingement member to the rear of the inlet portion of its associated discharge pan.

13. The apparatus according claim 11, wherein the funnel shaped discharge pans have a valley angle not less than approximately 50 degrees.

14. The apparatus according to claim 13, wherein the valley angle is approximately 60 degrees.

15. The apparatus according to claim 11, wherein the securing means comprises a pair of plates extending within the inlet portion of each discharge pan and through slots in a rear of the inlet portion, each plate welded at one end to a front of the inlet portion, an opposite end of each plate terminating outside of the rear of the inlet portion of its associated discharge pan and supporting a horizontal plate at the rear of the discharge pan, and a weld connecting the lower end of the impingement member to the rear of the inlet portion of its associated discharge pan.

16. The apparatus according to claim 11, wherein the impingement members of the impact type particle separator are U-shaped, E-shaped, W-shaped or of some similar concave or cupped configuration.

17. The apparatus according to claim 11, wherein the impingement members are U-beams and the open flow area defined within sides of each impingement member is approximately 42 in.$^2$, the outlet flow area of the outlet portion of each discharge pan is approximately 42 in.$^2$ to approximately 44 in.$^2$, and the inlet flow area of the inlet portion of each discharge pan is approximately 79 in.$^2$ to approximately 159 in.$^2$.

18. An apparatus for an impact type particle separator used to collect particles from particle-laden flue gas in a circulating fluidized bed (CFB) boiler which provides for drainage of particles from spaces in between adjacent impingement members of the particle separator as well as from inside of the impingement member and which minimizes gas bypassing around a lower end of the particle separator, comprising:

a funnel shaped discharge pan having an inlet portion for receiving the lower end of an impingement member and an outlet portion for discharging particles therefrom, the outlet portion having an outlet flow area approximately equal to an open flow area defined within sides of the impingement member, the inlet portion having an inlet flow area greater than the outlet flow area of the outlet portion; and securing means for securing the discharge pan to the lower end of the impingement member, wherein the securing means includes a pair of plates extending within the inlet portion of the discharge pan, welded at their ends to a front and a rear plate of the inlet portion and at their sides to the lower end of the impingement member, and a weld connecting the lower end of the impingement member to the rear plate of the inlet portion of the discharge pan.

19. An apparatus for an impact type particle separator used to collect particles from particle-laden flue gas in a circulating fluidized bed (CFB) boiler which provides for drainage of particles from spaces in between adjacent impingement members of the particle separator as well as from inside of the impingement member and which minimizes gas bypassing around a lower end of the particle separator, comprising:

a funnel shaped discharge pan having an inlet portion for receiving the lower end of an impingement member and an outlet portion for discharging particles therefrom, the outlet portion having an outlet flow area approximately equal to an open flow area defined within sides of the impingement member, the inlet portion having an inlet flow area greater than the outlet flow area of the outlet portion; and securing means for securing the discharge pan to the lower end of the impingement member, wherein the securing means includes a pair of plates extending within the inlet portion of the discharge pan and through slots in a rear plate of the inlet portion, each plate welded at one end to a front plate of the inlet portion, an opposite end of each plate terminating outside of the rear plate of the inlet portion of the discharge pan and supporting a horizontal plate at the rear of the discharge pan, and a weld connecting the lower end of the impingement member to the rear plate of the inlet portion of the discharge pan.

20. An apparatus for an impact type particle separator used to collect particles from particle-laden flue gas in a circulating fluidized bed (CFB) boiler which provides for drainage of particles from spaces in between adjacent impingement members of the particle separator as well as from inside of the impingement member and which minimizes gas bypassing around a lower end of the particle separator, comprising:

a funnel shaped discharge pan having a front and which is asymmetrical about a vertical centerline when viewed from the front, an inlet portion for receiving the lower end of an impingement member and an outlet portion for discharging particles therefrom, the outlet portion having an outlet flow area approximately equal to an open flow area defined within sides of the impingement member, the inlet portion having an inlet flow area greater than the outlet flow area of the outlet portion; and securing means for securing the discharge pan to the lower end of the impingement member.

21. An apparatus for an impact type particle separator used to collect particles from particle-laden flue gas in a circulating fluidized bed (CFB) boiler which provides for drainage of particles from spaces in between adjacent U-beam impingement members of the particle separator as well as from inside of each U-beam impingement member and which minimizes gas bypassing around a lower end of the particle separator, comprising:

a funnel shaped discharge pan having an inlet portion for receiving the lower end of the U-beam impingement member and an outlet portion for discharging particles therefrom, the outlet portion having an outlet flow area of approximately 42 in.$^2$ to approximately 44 in.$^2$ which is approximately equal to an open flow area of approximately 42 in.$^2$ defined within sides of the U-beam impingement member, the inlet portion having an inlet flow area of approximately 79 in.$^2$ to approximately 159 in.$^2$ which is greater than the outlet flow area of the outlet portion; and securing means for securing the discharge pan to the lower end of the U-beam impingement member.

22. An apparatus for an impact type particle separator used to collect particles from particle-laden flue gas in a circulating fluidized bed (CFB) boiler which provides for drainage of particles from spaces in between adjacent impingement members of the particle separator as well as from inside of the impingement member and which minimizes gas bypassing around a lower end of the particle separator, comprising:

a funnel shaped discharge pan having a height H of approximately 14 in. and an inlet portion with a height h of approximately 4 in. for receiving the lower end of an impingement member, and an outlet portion for discharging particles therefrom, the outlet portion having an outlet flow area approximately equal to an open flow area defined within sides of the impingement member, the inlet portion having an inlet flow area greater than the outlet flow area of the outlet portion; and securing means for securing the discharge pan to the lower end of the impingement member.

23. An apparatus for an impact type particle separator used to collect particles from particle-laden flue gas in a circulating fluidized bed (CFB) boiler which provides for drainage of particles from spaces in between adjacent impingement members of the particle separator as well as from inside of the impingement member and which minimizes gas bypassing around a lower end of the particle separator, comprising:

a funnel shaped discharge pan having an inlet portion for receiving the lower end of an impingement member, an outlet portion for discharging particles therefrom, and a valley angle not less than approximately 50 degrees, the outlet portion having an outlet flow area approximately equal to an open flow area defined within sides of the impingement member, the inlet portion having an inlet flow area greater than the outlet flow area of the outlet portion; and securing means for securing the discharge pan to the lower end of the impingement member.

24. An apparatus for an impact type particle separator used to collect particles from particle-laden flue gas in a circulating fluidized bed (CFB) boiler which provides for drainage of particles from spaces in between adjacent impingement members of the particle separator as well as from inside of the impingement member and which minimizes gas bypassing around a lower end of the particle separator, comprising:

a funnel shaped discharge pan having an inlet portion for receiving the lower end of an impingement member, an outlet portion for discharging particles therefrom, and a valley angle not less than approximately 60 degrees, the outlet portion having an outlet flow area approximately equal to an open flow area defined within sides of the impingement member, the inlet portion having an inlet flow area greater than the outlet flow area of the outlet portion; and securing means for securing the discharge pan to the lower end of the impingement member.

25. In a circulating fluidized bed (CFB) boiler having an impact type primary particle separator used to collect particles from particle-laden flue gas in the CFB boiler, the primary particle separator having a plurality of impingement members for collecting and removing particles from the flue gas, an apparatus which provides for drainage of particles from spaces in between adjacent impingement members as well as from inside of the impingement members and which minimizes gas bypassing around a lower end of the particle separator, comprising:

for each impingement member, a funnel shaped discharge pan having an inlet portion for receiving the lower end of its associated impingement member and an outlet portion for discharging particles therefrom, the outlet portion having an outlet flow area approximately equal to an open flow area defined within sides of its associated impingement member, the inlet portion having an inlet flow area greater than the outlet flow area of the outlet portion; and securing means for securing each discharge pan to the lower end of its associated impingement member, wherein the securing means includes a pair of plates extending within the inlet portion of each discharge pan, welded at their ends to a front and a rear of the inlet portion and at their sides to the lower end of its associated impingement member, and a weld connecting the lower end of each impingement member to the rear of the inlet portion of its associated discharge pan.

26. In a circulating fluidized bed (CFB) boiler having an impact type primary particle separator used to collect particles from particle-laden flue gas in the CFB boiler, the primary particle separator having a plurality of impingement members for collecting and removing particles from the flue gas, an apparatus which provides for drainage of particles from spaces in between adjacent impingement members as well as from inside of the impingement members and which minimizes gas bypassing around a lower end of the particle separator, comprising:

for each impingement member, a funnel shaped discharge pan having an inlet portion for receiving the lower end of its associated impingement member, an outlet portion for discharging particles therefrom, and a valley angle not less than approximately 50 degrees, the outlet portion having an outlet flow area approximately equal to an open flow area defined within sides of its associated impingement member, the inlet portion having an inlet flow area greater than the outlet flow area of the outlet portion; and securing means for securing each discharge pan to the lower end of its associated impingement member.

27. In a circulating fluidized bed (CFB) boiler having an impact type primary particle separator used to collect particles from particle-laden flue gas in the CFB boiler, the primary particle separator having a plurality of impingement members for collecting and removing particles from the flue gas, an apparatus which provides for drainage of particles from spaces in between adjacent impingement members as well as from inside of the impingement members and which minimizes gas bypassing around a lower end of the particle separator, comprising:

for each impingement member, a funnel shaped discharge pan having an inlet portion for receiving the lower end of its associated impingement member, an outlet portion for discharging particles therefrom, and a valley angle not less than approximately 60 degrees, the outlet portion having an outlet flow area approximately equal to an open flow area defined within sides of its associated impingement member, the inlet portion having an inlet flow area greater than the outlet flow area of the outlet portion; and securing means for securing each discharge pan to the lower end of its associated impingement member.

28. In a circulating fluidized bed (CFB) boiler having an impact type primary particle separator used to collect particles from particle-laden flue gas in the CFB boiler, the primary particle separator having a plurality of impingement members for collecting and removing particles from the flue gas, an apparatus which provides for drainage of particles from spaces in between adjacent impingement members as well as from inside of the impingement members and which minimizes gas bypassing around a lower end of the particle separator, comprising:

for each impingement member, a funnel shaped discharge pan having an inlet portion for receiving the lower end of its associated impingement member and an outlet portion for discharging particles therefrom, the outlet portion having an outlet flow area approximately equal to an open flow area defined within sides of its associated impingement member, the inlet portion having an inlet flow area greater than the outlet flow area of the outlet portion; and securing means for securing each discharge pan to the lower end of its associated impingement member, wherein the securing means includes a pair of plates extending within the inlet portion of each discharge pan and through slots in a rear of the inlet portion, each plate welded at one end to a front of the inlet portion, an opposite end of each plate terminating outside of the rear of the inlet portion of its associated discharge pan and supporting a horizontal plate at the rear of the discharge pan, and a weld connecting the lower end of the impingement member to the rear of the inlet portion of its associated discharge pan.

29. In a circulating fluidized bed (CFB) boiler having an impact type primary particle separator used to collect particles from particle-laden flue gas in the CFB boiler, the primary particle separator having a plurality of U-beam impingement members for collecting and removing particles from the flue gas, an apparatus which provides for drainage of particles from spaces in between adjacent U-beam impingement members as well as from inside of the U-beam impingement members and which minimizes gas bypassing around a lower end of the particle separator, comprising:

for each U-beam impingement member, a funnel shaped discharge pan having an inlet portion for receiving the lower end of its associated U-beam impingement member and an outlet portion for discharging particles therefrom, the outlet portion having an outlet flow area of approximately 42 in.$^2$ to approximately 44 in.$^2$ which is approximately equal to an open flow area of approximately 42 in.$^2$ defined within sides of its associated U-beam impingement member, the inlet portion having an inlet flow area of approximately 70 in.$^2$ to approximately 159 in.$^2$ which is greater than the outlet flow area of the outlet portion; and securing means for securing each discharge pan to the lower end of its associated U-beam impingement member.

* * * * *